United States Patent
McKinnon et al.

(10) Patent No.: US 10,677,962 B2
(45) Date of Patent: Jun. 9, 2020

(54) ESTIMATING TEMPERATURE VALUES AT FIELD LEVEL BASED ON LESS GRANULAR DATA

(71) Applicant: The Climate Corporation, San Francisco, CA (US)

(72) Inventors: Karen McKinnon, Somerville, MA (US); Stephan Hoyer, San Francisco, CA (US)

(73) Assignee: The Climate Corporation, San Francisco, CA (US)

( * ) Notice: Subject to any disclaimer, the term of this patent is extended or adjusted under 35 U.S.C. 154(b) by 822 days.

(21) Appl. No.: 14/640,900

(22) Filed: Mar. 6, 2015

(65) Prior Publication Data

US 2016/0259089 A1    Sep. 8, 2016

(51) Int. Cl.
    *G01W 1/00* (2006.01)
    *G06Q 10/04* (2012.01)
    *G06Q 50/02* (2012.01)

(52) U.S. Cl.
    CPC .............. *G01W 1/00* (2013.01); *G06Q 10/04* (2013.01); *G06Q 50/02* (2013.01)

(58) Field of Classification Search
    CPC .......... G01W 1/00; G06Q 50/02; G06Q 10/04
    USPC ......................................................... 702/3
    See application file for complete search history.

(56) References Cited

U.S. PATENT DOCUMENTS

| 6,535,817 B1 * | 3/2003 | Krishnamurti .......... G01W 1/10 702/3 |
| 2004/0064255 A1 * | 4/2004 | Egi ........................ G01W 1/00 702/3 |
| 2014/0311173 A1 | 10/2014 | Nilles et al. |
| 2015/0042746 A1 | 2/2015 | Lewis et al. |

OTHER PUBLICATIONS

European Patent Office, "Search Report" in application No. PCT/US2016/021050, dated May 19, 2016, 9 pages.
European Claims in application No. PCT/US2016/021050, dated May 2016, 7 pages.
European Patent Office, Search Report: in application No. 16 710 592.3-1217, dated Mar. 13, 2019, 7 pages.
European Claims in application No. 16 710 592.3-1217, dated Mar. 2019, 5 pages.

* cited by examiner

*Primary Examiner* — Anthony Ho
(74) *Attorney, Agent, or Firm* — Elliot H. Karlin; Hickman Palermo Becker Bingham LLP

(57) ABSTRACT

A method for temperature interpolation is provided. In an embodiment climatology records and temperature observations are received by a weather computing system over a network from an outside source. The temperature observations are subtracted from the climatology records to create anomalies. The anomalies are extrapolated across a map using various modeling methods and stored in the volatile memory of weather computing system. When the weather computing system receives a request for a temperature at a specific location, the weather computing system retrieves the anomaly field from the volatile memory and applies it to the climatology records at the requested location to determine the temperature for that location.

22 Claims, 8 Drawing Sheets

ESTIMATING TEMPERATURE VALUES AT FIELD LEVEL BASED ON LESS GRANULAR DATA

FIELD OF THE DISCLOSURE

The present disclosure generally relates to computer systems useful in climatology and agriculture. The disclosure relates more specifically computer systems that are programmed to provide estimate data relating to weather information, such as surface temperature, dew temperature, or precipitation, for agricultural fields or other facilities, and to techniques for compensating for missing temperature measurement data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Agricultural production requires significant strategy and analysis. In many cases, agricultural growers, such as farmers or others involved in agricultural cultivation, are required to analyze a variety of data to make strategic decisions months in advance of the period of crop cultivation known as the growing season. In making such strategic decisions, growers may consider fuel and resource costs, historical and projected weather trends, soil conditions, projected risks posed by pests, disease and weather events, and projected market values of agricultural commodities or crops. Analyzing these decision constraints may help a grower to predict key agricultural outcomes including crop yield, energy usage, cost and resource utilization, and farm profitability. Such analysis may inform a grower's strategic decisions of determining crop cultivation types, methods, and timing.

Despite its importance, such analysis and strategy is difficult to accomplish for a variety of reasons. First, obtaining reliable information for the various considerations of the grower is often difficult. Second, aggregating such information into a usable manner is a time consuming task. Third, where data is available, it may not be precise enough to be useful to determine strategy. For example, historical or projected weather data is often generalized for a large region such as a county or a state. In reality, weather may vary significantly at a much more granular level, such as an individual field. In addition, terrain features may cause weather data to vary significantly in even small regions.

Additionally, current climatology systems lack information that may be useful to farmers in making decisions regarding the fields. For example, most climatology systems use point estimates without factoring in possible errors, deviations, or risk of anomalous events. These errors may propagate when fed into an agronomic model, such as models that estimate heat stress or growing degree days for crops. Accordingly, methods for accurately estimating temperature variables at a granular level are desirable.

SUMMARY OF THE INVENTION

The appended claims may serve as a summary of the invention.

DETAILED DESCRIPTION

Figure 1:
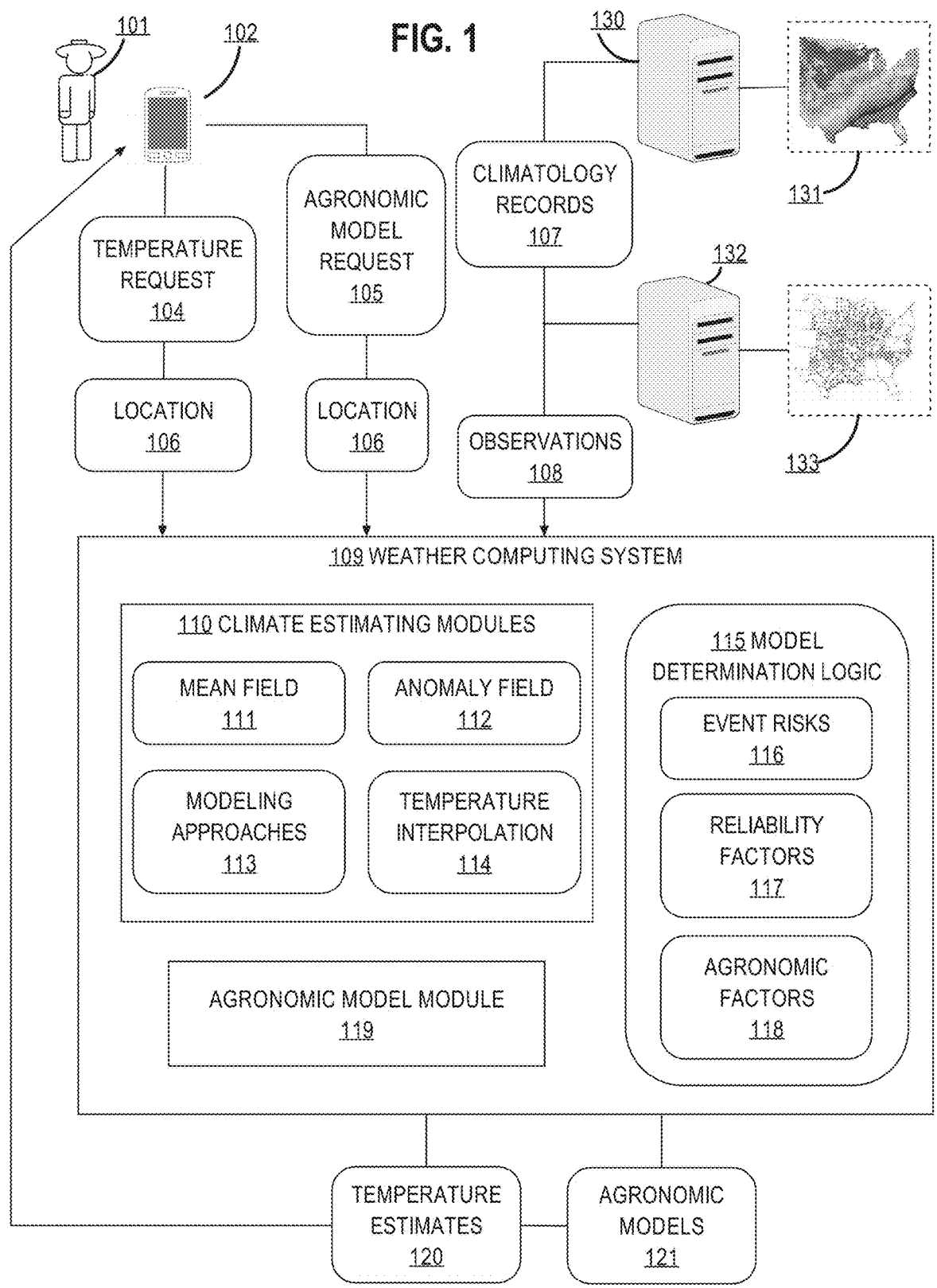
FIG. 1 is an example data flowchart of interpolating temperature using a weather computing system.

We further expressly incorporate by reference the specification and drawings of the following related applications: (1) U.S. provisional patent application Ser. No. 62/049,898, filed Sep. 12, 2014, titled "Method and Systems for Managing Agricultural Activities, (2) U.S. provisional patent application Ser. No. 62/049,937, filed Sep. 12, 2014, titled "Method and Systems for Recommending Agricultural Activities, (3) U.S. provisional patent application Ser. No. 62/049,909, filed Sep. 12, 2014, titled "Method and Systems for Determining Agricultural Revenue, (4) U.S. provisional patent application Ser. No. 62/049,929, filed Sep. 12, 2014, titled "Method and Systems for Managing Crop Harvesting Activities, the content of which are expressly incorporated by reference herein.

In the following description, for the purposes of explanation, numerous specific details are set forth in order to provide a thorough understanding of the present disclosure. It will be apparent, however, that the embodiments may be practiced without these specific details. In other instances, well-known structures and devices are shown in block diagram form in order to avoid unnecessarily obscuring the present disclosure. The description is provided according to the following outline:

General Overview
Structural Overview
Temperature Interpolation
Modeling Approaches
Creating Temperature Estimates
Application to Agronomic Modules
Data Aggregation
Selecting A Modeling Method
Hardware Overview
Benefits Of Certain Embodiments
Extensions And Alternatives
General Overview Aspects of the disclosure generally relate to computer-implemented techniques for creating precise estimates of surface temperature, or other weather variables such as dewpoint temperature or precipitation, at a granular level. In an embodiment, a weather computing system receives weather data that is generalized at a high level and actual observed weather data from a plurality of observation posts. The weather computing system creates an anomaly field by subtracting the observed temperatures from the temperature estimates and extrapolating the results across a map that corresponds to the area covered by the weather data. When the weather computing system receives a request for temperature estimates at a given location, the weather computing system retrieves the anomaly field and applies the value of the anomaly field for the given location to the generalized weather data to create a more precise weather estimate at a granular level.

In an embodiment, a data processing method comprises using a climate estimating module in a server computer, receiving, over a computer network, one or more climatology records each comprising a plurality of data values representing minimum temperature and maximum temperature in a plurality of locations; using the climate estimating module, creating and storing one or more mean fields in memory of the server computer based on the one or more climatology records; using the climate estimating module, receiving, over the computer network, a plurality of different observed temperature measurement values from a plurality of observation posts; using the climate estimating module, creating one or more anomaly field values in the memory based on a difference between the temperature values in the one or more climatology records and the observed temperature measurements from the plurality of observation posts; using the climate estimating module, estimating, based on the mean field and one or more anomaly fields, one or more particular temperature values at one or more particular locations that are different than locations of the plurality of observation posts and substituting the one or more particular temperature values in the memory in place of one or more of the plurality of data values in the one or more climatology records.

Other features and aspects of the disclosure will become apparent in the drawings, description and the claims.

Structural Overview

FIG. 1 is an example data flowchart of interpolating temperature using a weather computing system.

In an embodiment, a user 101 is associated with a user device 102, which is configured to provide a temperature request 132 for a location 106 to a weather computing system 109. The user device 102 also is configured to provide an agronomic model request 105 for a location 106 to the system 109. A climatology record server 130 and observation post server 132 are coupled to the system 109 and are configured respectively to deliver climatology records 107 and observations 108 to the system. The weather computing system 109 is configured to determine one or more temperature estimates 120 and one or more agronomic models 121 and to provide them to user device 102 of user 101.

In an embodiment, weather computing system 109 comprises climate estimating modules 110, model determination logic 115, and agronomic model module 119. In an embodiment, climate estimating modules 110 comprises a mean field 111, anomaly field 112, stored modeling approaches 113, and temperature interpolation 114. Fields 111, 112 and interpolation 114 may comprise data values stored in memory. In an embodiment, model determination logic 115 comprises event risks 116, reliability factors 117, and agronomic factors 118. The event risks 116, reliability factors 117, and agronomic factors 118 may comprise data values stored in memory. Each of the foregoing elements is further described in structure and function in other sections herein. Weather computer system 109 also may include other devices, components or elements of a computer system such as volatile or non-volatile memory, non-volatile storage such as disk, and I/O devices as seen and described, for example, in connection with FIG. 8.

In an embodiment, climate estimating modules 110 are generally configured or programmed to perform translation and storage of data, aggregation of data, and temperature estimation. Mean field module 111 is configured to translate climatology records into a format usable by anomaly field module 112 and temperature interpolation module 114 and store the translated climatology records as mean fields. Anomaly field module 112 is configured to calculate anomalies between the stored mean field and observations 108. Anomaly field module 112 is configured to store the anomaly fields for use by temperature interpolation module 114. Modeling approaches module 113 is configured to store modeling approaches along with ratings for each of the modeling approaches. Temperature interpolation module 114 is configured to apply the stored modeling approaches to create temperature estimates at location 106.

In an embodiment, model determination logic 115 is generally configured or programmed to perform calculation of ratings for the modeling approaches and selection of a modeling approach based on one or more ratings. Event risks module 116 is configured to calculate ratings for the modeling approaches based on accuracy, consistency, and bias with respect to the occurrence of specific events and the date of occurs of specific events. Reliability factors module 117 is configured to calculate ratings for the modeling approaches based on differences between the temperature estimates at one or more observation location and the measured temperatures at the one or more observation location. Agronomic factors module 118 is configured to create ratings for the modeling approaches based on the accuracy, consistency, and bias of the estimates of agronomic factors using temperature estimates calculated with the modeling approaches.

In an embodiment, agronomic model modules 119 are generally configured or programmed to perform calculation and storage of agronomic factors using temperature estimates. Agronomic model modules 119 are also configured to generate alerts based on the stored agronomic factors.

For purposes of illustrating a clear example, FIG. 1 shows a limited number of instances of certain functional elements. However, in other embodiments, there may be any number of such elements. For example, embodiments may use thousands or millions of different user devices 102 associated with different users. Further, system 109 and servers 130, 132 may be implemented using two or more processors, cores, clusters, or instances of physical machines or virtual machines, configured in a discrete location or co-located with other elements in a datacenter, shared computing facility or cloud computing facility. In some embodiments, climatology records server 130, observations post server 132, or both climatology records server 130 and observation post server 132 are the same computing device as weather computing system 109.

Each of the climate estimating modules 110, model determination logic 115, and agronomic model module 119 may be implemented using one or more computer programs or other software elements that are loaded into and executed using one or more general-purpose computers, logic implemented in field programmable gate arrays (FPGAs) or application-specific integrated circuits (ASICs).

In an embodiment, the implementation of the functions described herein for climate estimating modules 110, model determination logic 115, and agronomic model module 119 using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve as algorithms, plans or directions that may be used to program a computer or logic to implement the functions that are described.

Weather computing system 109 may communicate with user device 102, climatology record server 130, and observation post server 132 over one or more computer networks. The network(s) may be implemented by any medium or mechanism that provides for the exchange of data between the various elements of FIG. 1. Examples include one or more Local Area Networks (LANs), Wide Area Networks (WANs), or internetworks using terrestrial, satellite or wireless links. The various elements of FIG. 1 may also have direct (wired or wireless) communications links.

In an embodiment, user 101 interacts with weather computing system 109 using user device 102 configured with an operating system and one or more application programs or apps. User device 102 may be a smart phone, PDA, tablet computing device, laptop, or any other computing device capable of transmitting and receiving information and performing the functions described herein. User device 102 may communicate via a network using a suitable method of interaction including a user application stored on user device 102.

The user application may provide server-side functionality, via the network to one or more user devices. In an example embodiment, user device 102 may access the user application via a web client or a programmatic client. User device 102 may transmit data to, and receive data from, one or more front-end servers. In an example embodiment, the data may take the form of requests and user information input, such as field-specific data, into the user device. In some embodiments, the user application interacts with tracking software on user device 102 which determines the location of user device 102 using standard tracking techniques such as multilateration of radio signals, the global positioning system (GPS), WiFi positioning systems, or other methods of mobile positioning.

In an embodiment, user device 102 sends temperature request 104 or agronomic model request 105 to weather computing system 109. User device 102 may send the requests in response to input from user 101. Alternatively, user device 102 may be configured to send the requests without user input, such as at scheduled intervals. User device 102 also sends location 106 to weather computing system 109. User device 102 may determine location 106 using tracking software executing on user device 102. Alternatively, user 101 may input location 106 as coordinates corresponding to one or more fields. In an embodiment, location 106 is a precise point location, such as the exact coordinates of user device 102. In other embodiments, location 106 is a bounded area, such as a field or series of fields.

In an embodiment, climatology record server 130 contains climatology records 107 obtained on the basis of geographical locations that may be associated with map 131. Climatology records 107 may include averages of historical temperature variables for a given time. For example, monthly climatology records may include average maximum temperatures, minimum temperatures, and mean temperatures for each month of the year. These monthly climatology records may be based on historical data for the past 30 years. Daily climatology records may include averages for a specific day of the year. Additionally, weather computing system 109 may receive a plurality of historical climatology records for a given month spanning a plurality of years. Weather computing system 109 receives climatology records 107 to be used as mean field 111, as further described herein.

In an embodiment, climatology records 107 are stored in a database indexed by the date of the records or some other identifiable characteristic. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, Oracle® Database, MySQL, IBM® DB2, Microsoft® SQL Server, Sybase®, and PostgreSQL. However, any database may be used that enables the systems and methods described herein.

In an embodiment, observation post server 132 contains observations 108 that may be based upon sensors, devices or computers at distributed geographic locations as represented by map 133. Observations 108 may include daily minimums and daily maximums of temperature measured by a plurality of geographically distributed observation posts. Additionally, observations 108 may include current observations of temperature at the plurality of observation posts. Weather computing system 109 may receive observations 108 from observation post server 132 periodically by push, poll, or other collection techniques. Using the climatology records received from climatology record server 130 and the observations received from observation post server 108, weather computing system 109 is configured to generate temperature interpolation 114 in the manner further described herein.

In various embodiments, the climatology records may comprise an estimate of the climatology for a particular month, or may comprise historical records for prior years that are averaged out into a map. The mean field 11 may comprise a generalized climatology for a particular month. Anomalies may comprise differences between actual observations and the values on the climatology maps. In an embodiment, the climatology records may be purchased, received or obtained from different sources. In an embodiment, the observations may be purchased, received or obtained from an earth-orbiting satellite that maintains observation posts that measure the temperature on a given day.

Temperature Interpolation

Figure 2:
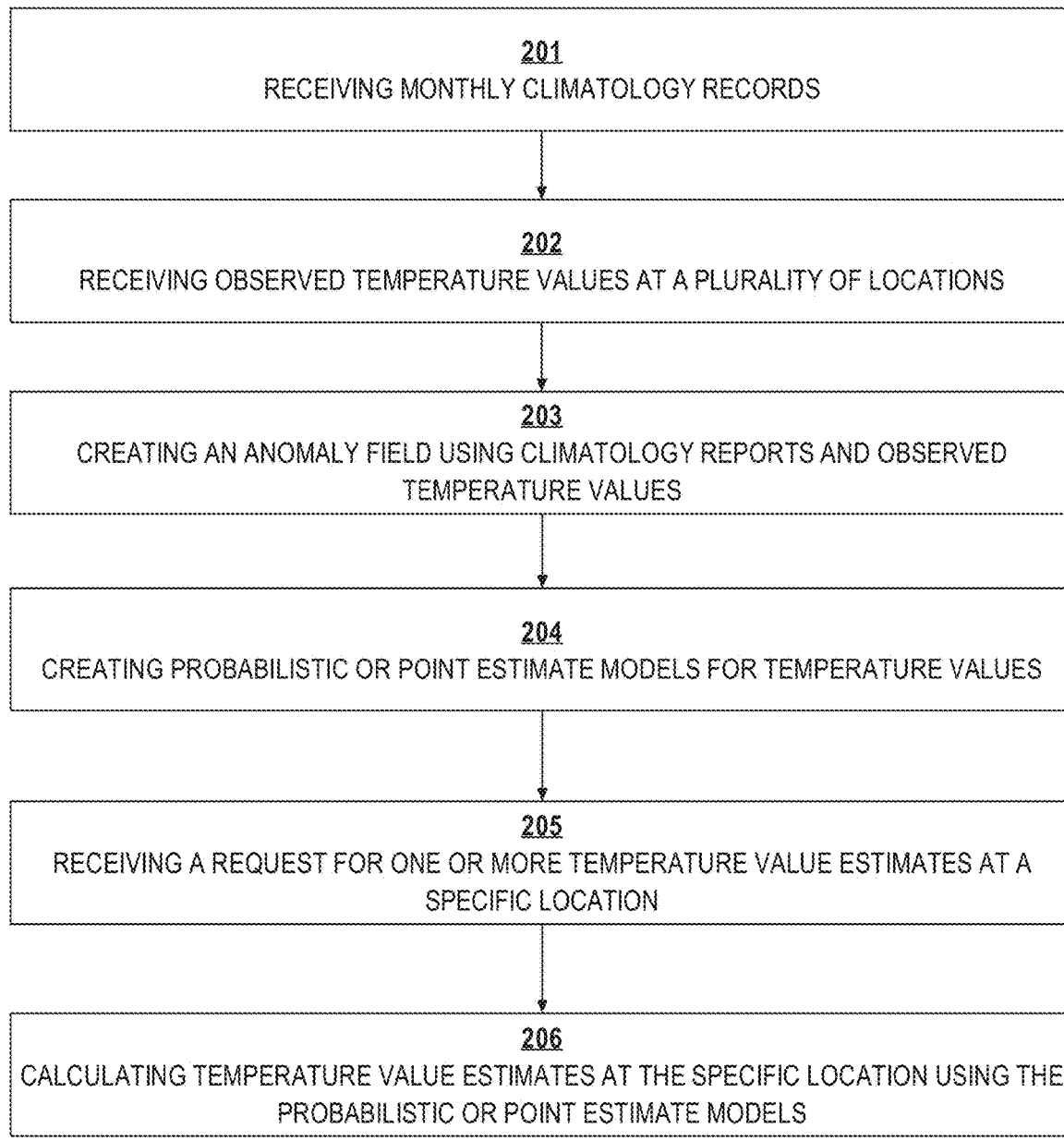
FIG. 2 is a flow chart which depicts an example method for interpolating temperature at one or more specific locations.

FIG. 2 illustrates an example process of interpolating temperature at one or more specific locations. For purposes of illustrating a clear example, FIG. 2 is described in the context of the system of FIG. 1, but other embodiments may be implemented using other kinds of computer systems.

At step 201, monthly climatology records are received. For example, weather computing system 109 receives monthly climatology records 107 from climatology record server 130. Weather computing system 109 stores monthly climatology records 107 to be used as mean field 111. In an embodiment, monthly climatology records are based on historical averages or historical trends over a large period of time.

At step 202, the process receives temperature values that have been observed at a plurality of locations. For example, weather computing system 109 receives observations 108 from observation post server 132.

At step 203, the process creates an anomaly field using climatology reports and observed temperature values. For example, weather computing system 109 creates anomaly field 112 using mean field 111 and observations 108. Weather computing system 109 starts by subtracting mean field 111 from observations 108. The remaining points are considered differences, or anomalies, between mean field 111 and observations 109. Weather computing system 109 may generate a map of anomalies called the anomaly field. Anomaly field 112 is assumed to be dependent on distance from one or more observation posts. By applying modeling approaches under the assumption that anomalies from mean field 111 are dependent only on distance, weather computing system 109 may create estimates of temperatures at different locations.

At step 204, the process creates probabilistic or point estimate models for temperature values, as further described herein. At step 205, the process receives a request for one or more temperature value estimates at a specific location. At step 206, the process calculates estimates of the temperature value at the specific location using the probabilistic or point estimate models. Example algorithms and techniques that can be used to implement step 204, 205, 206 are further described in separate sections.

The process of FIG. 2, as a whole, may be used to interpolate and deliver to a user computing device, in response to a request, precise estimates of actual temperature values at growing fields or other locations even when observed temperature values are incomplete, missing, available only at a less granular level such as for a city or county, or when climatology reports and/or observed temperature values include anomalies. Consequently, the performance of the end user computing device is improved because device applications may receive and use data that otherwise would not be available, and/or avoid errors that are introduced by using data that is incomplete or contains anomalies. Other benefits and improvements will be apparent from other parts of the disclosure as a whole.

Modeling Approaches

In one embodiment, step 204 comprises weather computing system 109 using one or more of modeling approaches 113 to create probabilistic or point estimate models for the temperature values. Modeling approaches 113 comprise stored data, programs or programmatic objects or methods to represent different methods of estimating temperatures at specific locations.

Some of the modeling approaches 113 may create point estimates. Point estimates represent a single estimate of temperature at a specific location. For example, a point estimate for a farmer's field on a given day may include a minimum temperature estimate of 54° F. and a maximum temperature estimate of 72° F. Additionally or alternatively, one or more of the modeling approaches 113 create probabilistic estimates. Probabilistic estimates represent a range of estimates with corresponding probability. For example, a probabilistic estimate for a farmer's field on a given day may include a 68% chance that the minimum temperature will be between 53.8° F. and 54.2° F. and a 95% chance that the minimum temperature will be between 53.6° F. and 54.4° F.

In an embodiment, the probabilistic estimates may be stored in memory or persistent data storage as a set of points representing a Gaussian curve that assumes a uniform distribution of probability. In a uniform distribution of probability, the likelihood that the actual temperature is below the average estimated temperature is equal to the likelihood that the actual temperature is above the average estimated temperature. The above example conforms to a Gaussian curve because the mean temperature of 54° is also the center point of both temperature ranges. Some probabilistic distributions are skewed to one side such that the likelihood the actual temperature is below the average estimated temperature value is not equal to the likelihood that the actual temperature is above the average estimated temperature.

In an embodiment, for data represented in climatology records 107 or observations 108, as the distance increases between the observation posts and the point of estimation, the spread in the probability distribution increases. At a location that is exceptionally close to an observation post the probability distribution may be very narrow with a spread of only a few tenths of a degree, while a probabilistic estimate for a location that is exceptionally distant from any observation post may contain a wider spread of multiple degrees. Point estimates, on the other hand, do not contain any variance based on the distance between the point of estimation and the observation posts. While a point estimate becomes less accurate as the distance increases, the inaccuracy is not captured as part of the estimation.

In one implementation, a first modeling approach implemented in a computer program comprises using Delaunay triangulation to segment a map of anomalies into triangles; the map is obtained by determining the difference between the temperature values in climatology records 107 and observations 108. Then, a distance weighting approach is used to create point estimates for a specific location. The first modeling approach uses the anomalies to create the series of triangles across the map. The temperatures for the locations within each triangle are calculated as a distance-weighted average of the anomalies at the vertices of the triangle. The anomaly estimation for a location that is extremely close to a single vertex of a triangle is weighted mostly towards the single vertex and only partially weighted towards the other two vertices. In contrast, the anomaly estimation for a location at equal distances from the three vertices is weighted equally to the three vertices.

Figure 3:
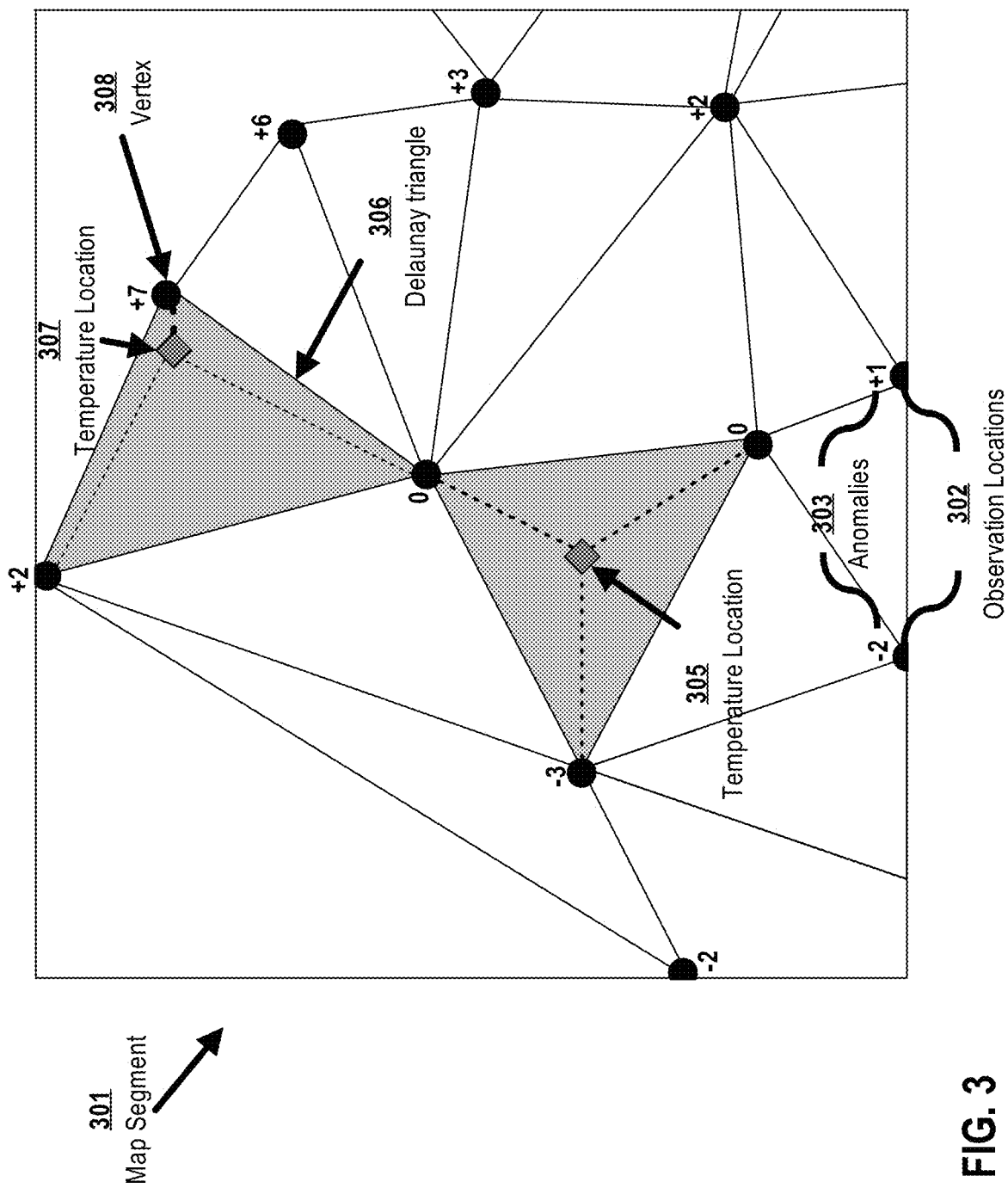
FIG. 3 depicts an example of an embodiment of temperature interpolation using Delaunay triangulation.

FIG. 3 depicts an example of an embodiment of temperature interpolation using Delaunay triangulation.

As an example, in FIG. 3 a segment 301 contains observation locations 302 which are represented by black dots in map segment 301. Each of observation locations 302 corresponds to one of anomalies 303. Anomalies 303 represent the difference between the temperature values in climatology records 107 and observations 108. Delaunay triangle 304 contains temperature location 305. Each of the features of FIG. 3 may be represented as data values stored in memory of the weather computing system 109 and the calculations, weighting and other operations described herein may be performed by executing computer programs that manipulate the values in memory.

Because temperature location 305 is located at the center of the surrounding observation locations, the anomalies at the surrounding observation locations may be weighted equally. The estimated anomaly for temperature location 305 may be the average of the surrounding locations (−3, 0, and 0), which is −1° F.

In contrast, Delaunay triangle 306 contains temperature location 307 located close to vertex 308. Because vertex 308 is so close to temperature location 307, the anomaly of vertex 308 is given greater weight. If temperature location 307 was positioned at the center of Delaunay triangle 306, then the anomaly would be estimated as the average of the vertices (2, 7, and 0), resulting in an estimated anomaly of +3° F. Since temperature location 307 is closer to vertex 308, the estimated anomaly may be closer to +7° F., the anomaly at vertex 308.

Figure 4:
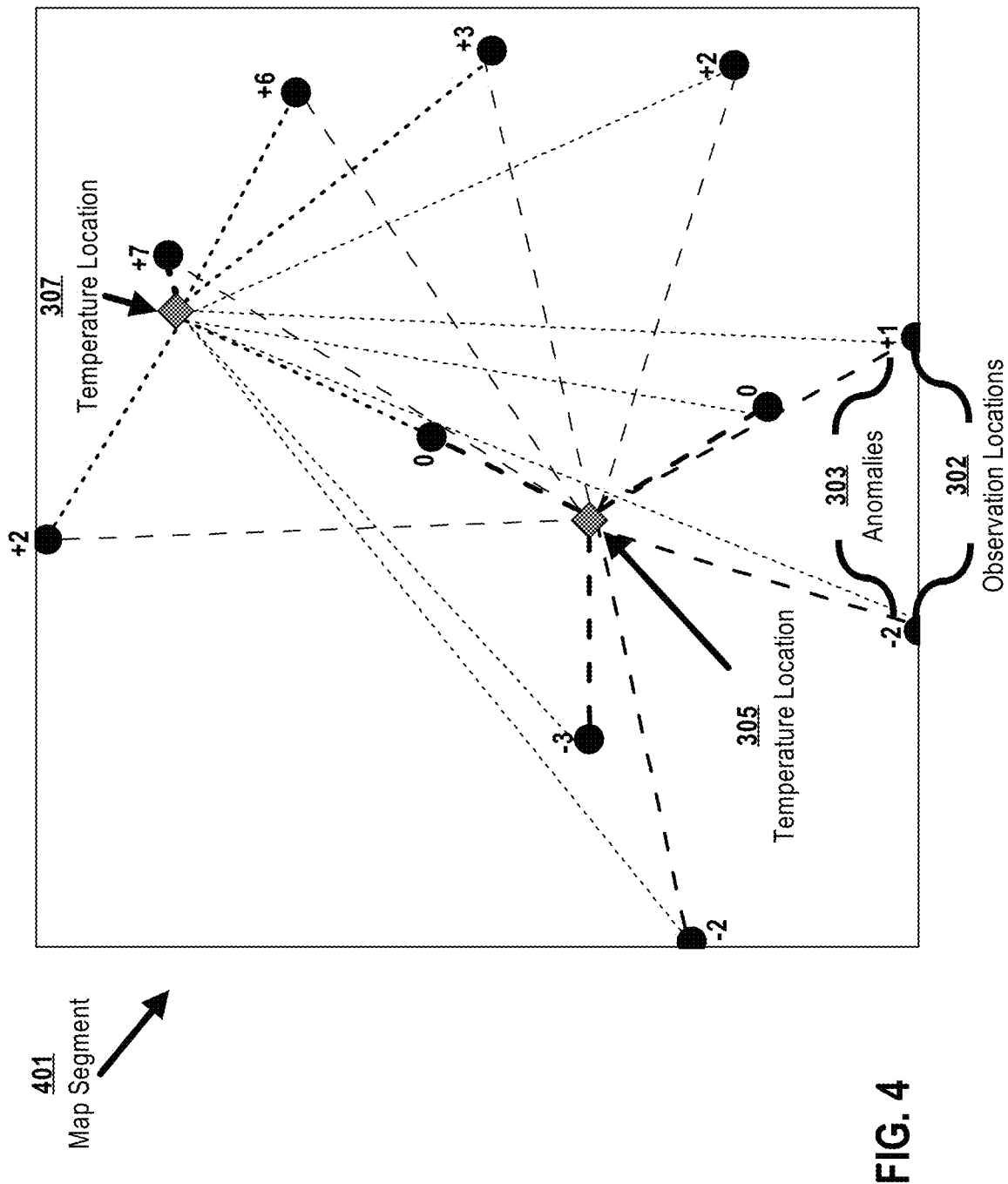
FIG. 4 depicts an example of an embodiment of temperature interpolation using inverse distance weighting.

A second modeling approach termed inverse distance weighting may be used additionally or alternatively to the first modeling approach. FIG. 4 depicts an example of an embodiment of temperature interpolation using inverse distance weighting.

Map segment 401 represents a plurality of observation locations 302. Each of observation locations 302 corresponds to one of anomalies 303. Each of the features of FIG. 4 may be represented as data values stored in memory of the weather computing system 109 and the calculations, weighting and other operations described herein may be performed by executing computer programs that manipulate the values in memory.

The anomalies at temperature locations 305, 307 are calculated as the weighted average of anomalies 303 such that the closest observation location has the largest effect on the estimation while even the furthest location is factored into the estimation. For example, while interpolation location 305 had an estimated anomaly of −1° F. under the first modeling approach, the higher and more frequent positive values in anomalies 303 would likely raise the estimate to closer to 0° F.

Figure 5:
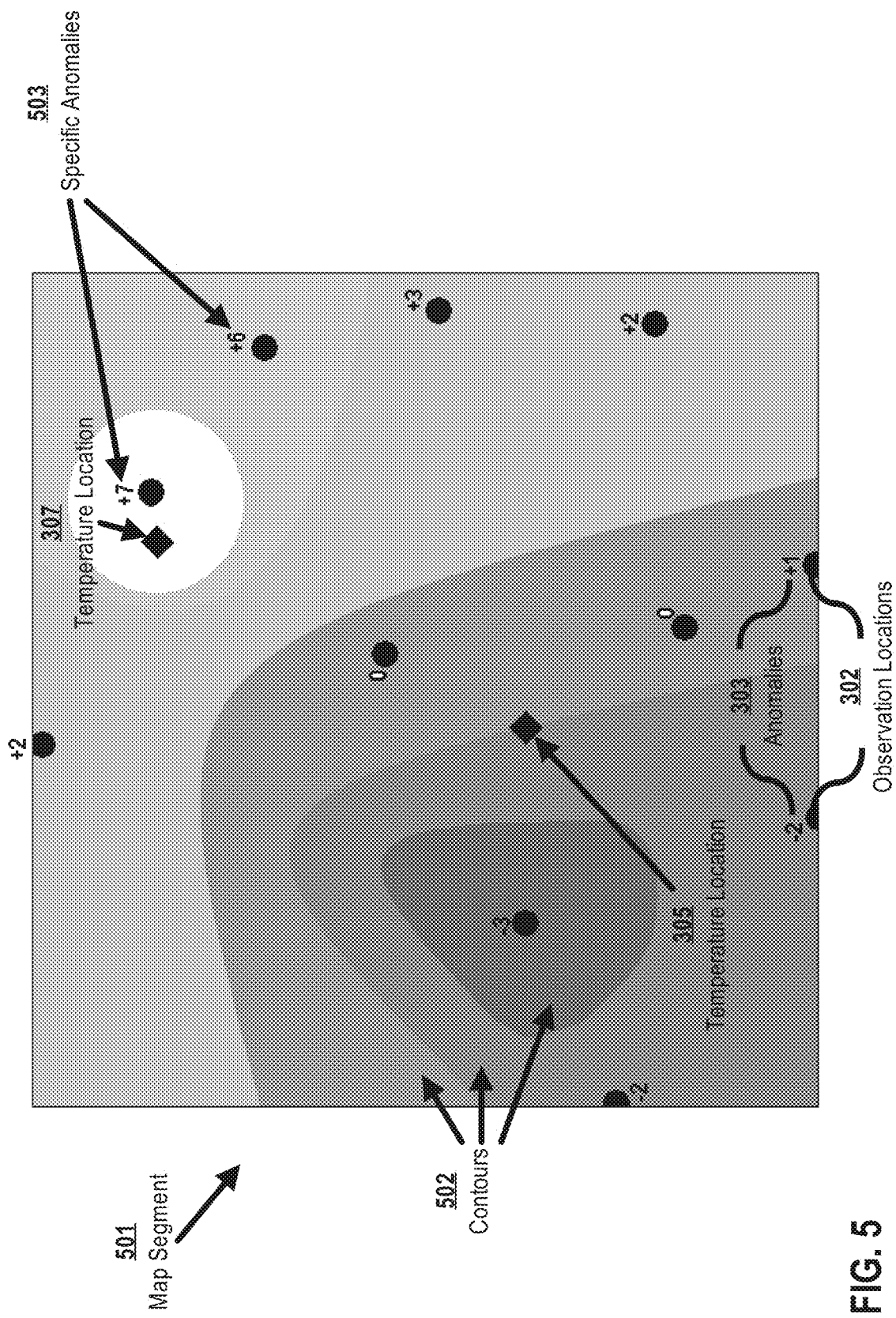
FIG. 5 depicts an example of an embodiment of temperature interpolation using thin-plate splines.

A third modeling approach termed thin-plate spline creates a multi-dimensional anomaly field. A spline is a numeric function that can be applied to multiple data points to create a smooth curve. Thin-plate splines are multi-dimensional extensions of one-dimensional smoothing splines. FIG. 5 depicts an example of an embodiment of temperature interpolation using thin-plate splines.

In an embodiment, a map segment 501 contains observation locations 302, each of which corresponds to one of anomalies 303. Contours 502 form a three-dimensional sheet surrounding observation locations 302 with the darker portions representing the sheet bending inward and the lighter portions representing the sheet bending outward. While FIG. 5 shows distinct gradations, in an embodiment contours are smooth such that the anomaly field gradually changes based on the location. Each of the features of FIG. 5 may be represented as data values stored in memory of the weather computing system 109 and the calculations, weighting and other operations described herein may be performed by executing computer programs that manipulate the values in memory.

With the third modeling approach, the multi-dimensional anomaly field is created as a function of all of the observation locations. In addition, due to the existence of a smoothness parameter, the highest and lowest values in the observation locations do not necessarily correlate to the highest or lowest values in the anomaly field. For example, specific anomalies 503 comprise an anomaly of +7 and +6. The anomaly field between the two may raise a small amount near the +7 anomaly before smoothing out and lowering towards the +6 anomaly based on the locations and values of the anomalies at the other locations.

A fourth modeling approach termed kriging assumes that the observed field is the sum of a smooth underlying field, with unknown mean and covariance, and Gaussian noise with unknown variance. Specifically, kriging creates a smooth field by weighting all of the data points and applying a probabilistic function such as Gaussian noise to account for possible variance. By assuming a combination of a smooth field with Gaussian noise, more accurate predictions of intermediate values may be created. An added benefit of the fourth modeling approach is that it can be used to create probabilistic estimates. Additionally, the Gaussian noise with unknown variance allows for explicitly incorporating uncertainty of the measurements at the observation posts. As the observation posts are not assumed to have flawless measurements, the incorporation of uncertainty allows the fourth modeling approach to more accurately reflect real world data.

In an embodiment, the parameters of the covariance for the smooth underlying field are unknown, but the covariance is assumed to have a fixed structure. For example, the covariance may be assumed to have the structure of a Matern covariance function with $v=2/3$ or $v=5/2$. The unknown parameters of the covariance function may be estimated using maximum likelihood or Markov Chain Monte Carlo. Maximum likelihood is a technique for selecting a set of parameters that maximizes the agreement of the covariance function with the observed data. Markov Chain Monte Carlo creates a series of algorithms such that the equilibrium probability distribution matches the covariance function. Then, the average of the values extracted from the algorithms is used to approximate the unknown parameters of the covariance function. In an embodiment, one of the above described estimation techniques is chosen based on a trade-off between computational efficiency and estimated error.

The first three modeling approaches described above create point estimates, while the fourth modeling approach creates a probabilistic estimate. For example, inverse distance weighting takes a weighted average of a number of values to create one distinct value. Modeling approaches that produce point estimates may be modified to create probabilistic estimates. For example, thin plate splines may be modified by adding Gaussian noise with a standard deviation of 1° C. (1.8° F.). Doing so creates a probabilistic estimate where each estimate of temperature include a 68% chance that the actual temperature is within 1° C. of the estimated temperature and a 95% chance that the actual temperature is within 2° C. of the estimated temperature.

The modeling approaches described above are examples of possible modeling approaches that may be used to interpolate temperature values at precise locations. The approaches described above are not intended as an exhaustive list of modeling methods and other modeling methods may be used by weather computing system 109 to interpolate temperatures at precise locations.

Once the anomaly is determined for the point of estimation, the temperature for the point of estimation can be derived. In an embodiment, weather computing system 109 derives the temperatures for the point of estimation by applying the estimated anomaly to mean field 111. For example, if the temperature at the point of estimation in mean field 111 is 74° F. and the estimated anomaly is −1° F., then the estimated temperature at the point of estimation is 73° F.

By applying the modeling approaches discussed above to anomalies instead of observed temperatures, deference is given to mean field 111 which accounts for dependence of temperature on elevation, coastal proximity, topographic face orientation, the likelihood of inversions, topographic position, and the orographic effectiveness of the terrain in causing precipitation events. For example, if a mountain stands between two observation posts, interpolation just based on the observed temperatures at the two observation posts would ignore the fact that the elevation of the mountain would decrease the temperature. In contrast, interpolating the anomalies would result in an estimated anomaly which would be applied to the lower temperature of the mountain from the mean field.

Creating Temperature Estimates

Referring again to FIG. 2, at step 205, in an embodiment the weather computing system 109 receives a request for one or more temperature values at a given location. Referring to FIG. 1, in an embodiment, user 101 uses user device 102 to initiate temperature request 104. Alternatively, user 101 may use user device 102 to initiate agronomic model request 105.

In alternative embodiments, user device 102 may automatically initiate temperature request 104 or agronomic model request 105 without user input. For example, software installed on user device 102 may be configured to initiate requests every few days. In another example, software installed on user device 102 may be configured to initiate requests in response to one or more events such as sharp changes in temperature or in response to receiving updates in one or more other applications.

In an embodiment, temperature request 104 and agronomic model request 105 are accompanied by a value for location 106. Location 106 may be the location of user device 102 at the moment user device 102 initiates the request as determined by an operating system, a GPS receiver and driver, or tracking software executing on the user device. Alternatively, location 106 may be determined by user input or stored through previous interactions with weather computing system 109.

In an embodiment, location 106 is sent from an application server which communicates with user device 102. In other embodiments, location 106 is stored on weather computing system as being associated with a specific user identifier. When weather computing system 109 receives temperature request 104 or agronomic model request 105, weather computing system 109 may identify the user or user device and determine location 106 based on the stored information in weather computing system 109.

Additionally, weather computing system 109 may initiate a request for one or more temperature values at a given location. As with user device 102, weather computing system 109 may be configured to generate estimates at a given interval, such as a new estimate for each associated user device each morning. Weather computing system 109 may also be configured to generate estimates in response to changes in climatology records, observations, or computations of anomaly fields. Alternatively, weather computing system 109 may receive the request for temperature values from a separate server, such as an application server which interacts with one or more applications on user device 102.

At step 206, temperature interpolation module 119 calculates temperature values at location 106 using one or more of modeling approaches. In an embodiment, temperature interpolation module 119 determines temperature values for a grid associated with location 106. Weather computing system may initially create square grids called temperature grids for determining temperature values. In an embodiment the grids are physical regions that encompass 2.5 miles by 2.5 miles of space. When weather computing system 109 receives the request for temperature values at location 106, weather computing system 109 associates location 106 with a temperature grid that contains location 106. If location 106 is a field that spans multiple grids, then weather computing system 109 may create estimates for each grid.

In some embodiments, weather computing device 109 sends temperature estimates 120 to user device 102. Temperature estimates 120 may take the form of specific temperature values for the day or portion of the day, a graph of temperature values for a period of time, or a range of temperature values. A temperature estimate may include the temperature variance. For example, a temperature estimate for a given day may include a max temperature between 96° F. and 98° F.

In an embodiment, weather computing system 109 may store temperature estimates 120 and anomaly field 112 in a database in volatile memory. Weather computing system 109 may use stored anomaly fields and historical climatology records to create future temperature estimates. Using the historical climatology records, the weather computing system 109 may create projections for the future by either averaging the climatology records for a given month or extrapolating the climatology records for a given month based on trends over the a period of time.

Weather computing system 109 may determine either anomaly trends or anomaly averages for the climatology records. As an example, weather computing system 109 may note that the climatology records for the current year tend to be high by 3° F. at the observation location in Gotham City. Weather computing system 109 may use the 3° F. anomaly in Gotham City when creating projected anomaly fields. As another example, weather computing system 109 may determine that the climatology records for the temperatures at the observation location in Quahog in June have been low by 5° F. for the past five years. Weather computing system 109 may use the 5° F. anomaly in Quahog when creating projected anomaly fields. In additional examples, weather computing system 109 may determine that the climatology records have been getting more or less accurate over time and use the trends in accuracy when creating projected anomaly fields.

Using projected anomaly fields and historical climatology records (or projected climatology records), weather computing system 109 may interpolate temperature for future months. Estimated temperature projections may be stored in volatile memory, sent to user device 102, or used by agronomic model module 119 to create agronomic models. Weather computing system 109 may be further configured to improve its method by comparing projected anomaly fields with anomaly fields created on that month using observations 108. For example, weather computing system 109 may determine that the projected anomaly fields tend to be 1° F. high for temperatures surrounding the observation location in South Park. Weather computing system 109 may alter its method for creating projected anomaly fields to account for the 1° F. offset.

Application to Agronomic Modules

In an embodiment, referring again to FIG. 1, agronomic model module 119 receives temperature estimates 120 and uses temperature estimates 120 to create an agronomic model. In an embodiment, an agronomic model is a data structure in memory of weather computer system 109 that contains location information and crop information for one or more fields. An agronomic model may also contain agronomic factors which describe conditions which may affect the growth of one or more crops on a field. Additionally, an agronomic model may contain recommendations based on the agronomic factors such as crop recommendations, watering recommendations, planting recommendations, and harvesting recommendations. Example agronomic factors include the growing season length, nighttime heat stress, daytime heat stress, and growing degree days.

The growing season length is the period of time in a given year when the climate is ideal for one or more specific plants to experience the most growth. Using temperature estimates for a given year at a specific location and a crop type for the specific location, agronomic model module 119 may determine the length of the growing season for the crop type at the specific location. Agronomic model module 119 may compare the growing season length for the specific crop to the growing season length for different crops and make recommendations based on the location. Additionally, agronomic model module 119 may create estimates for the development cycle of a crop along with recommendations on when to plant the crop and when to harvest the crop.

Heat stress describes the effect of high temperatures on the yield potential of a crop. Each crop has its own heat stress threshold which defines a maximum temperature before the yield potential of the crop is adversely affected. Additionally, crops are more adversely affected by heat stress during specific stages of development. Agronomic model module 119 may use the temperature estimates at a specific location and a crop type for the specific location to estimate the effects of both daytime and nighttime heat stress on a crop over the course of development of the crop. Agronomic model module 119 may use these estimates to create recommendations for the type of crop to plant and the ideal planting day for the crop. Additionally, agronomic model module 119 may use the estimates of the effect of heat stress on a crop to estimate the potential yield of a crop or provide estimates of the risk involved in planting a specific crop.

Growing degree days are a measure of heat accumulation over a day. A growing degree day is the measure of the contribution of the heat in a given day to a crop's development. A growing degree day is calculated by subtracting a base temperature from the average of the maximum temperature and minimum temperature for the day. The base temperature, which varies amongst types of crops, is the temperature below which the crop experiences no growth. Agronomic model module 119 may use the temperature estimates at a specific location to determine the growing degree days for a specific crop over the lifetime of the crop. By determining the growing degree days, agronomic model module 119 may estimate the optimal days to plant a crop, the amount of time it will take before the crop reaches development, and the optimal days to begin harvesting the crop. Agronomic model module 119 may also calculate the net gain for a specific crop based on how long the crop will take to grow at a specific location. Additionally, agronomic model module 119 may create alerts when a crop is nearing the end of its development cycle.

In an embodiment, weather computing system 109 uses the temperature estimates to create an agronomic model in memory or in persistent storage in response to a request from user device 102 for an agronomic model. In other embodiments, weather computing system 109 receives a request from a third party for an agronomic model. For example, an insurance company may request an agronomic model for an insured customer's field to determine the risks associated with the crop planted by the customer. In another example, an application server may send a request to weather computing system 109 to create an agronomic model for a specific user's field. Alternatively, weather computing system 109 may generate agronomic models periodically. Weather computing system 109 may also generate agronomic models in response to receiving updated temperature observations or in response to creating updated temperature estimates.

In an embodiment, weather computing system 109 sends agronomic models 121 to user device 102. In other embodiments, weather computing system 109 creates recommendations using agronomic models 121 and sends the recommendations to user device 102. In some embodiments, weather computing system may generate alerts based on information in agronomic models 121. For example, weather computing system 109 may generate an alert to be sent to user device 102 in response to determining that a specific crop is about to reach the end of its development based on the estimated number of growing degree days since the crop was planted. Weather computing system 109 may also store agronomic models 121 in memory. Stored agronomic models may later be used to improve methods used by agronomic model module 119 and temperature interpolation module 114 or to rate the various modeling methods.

Figure 6:
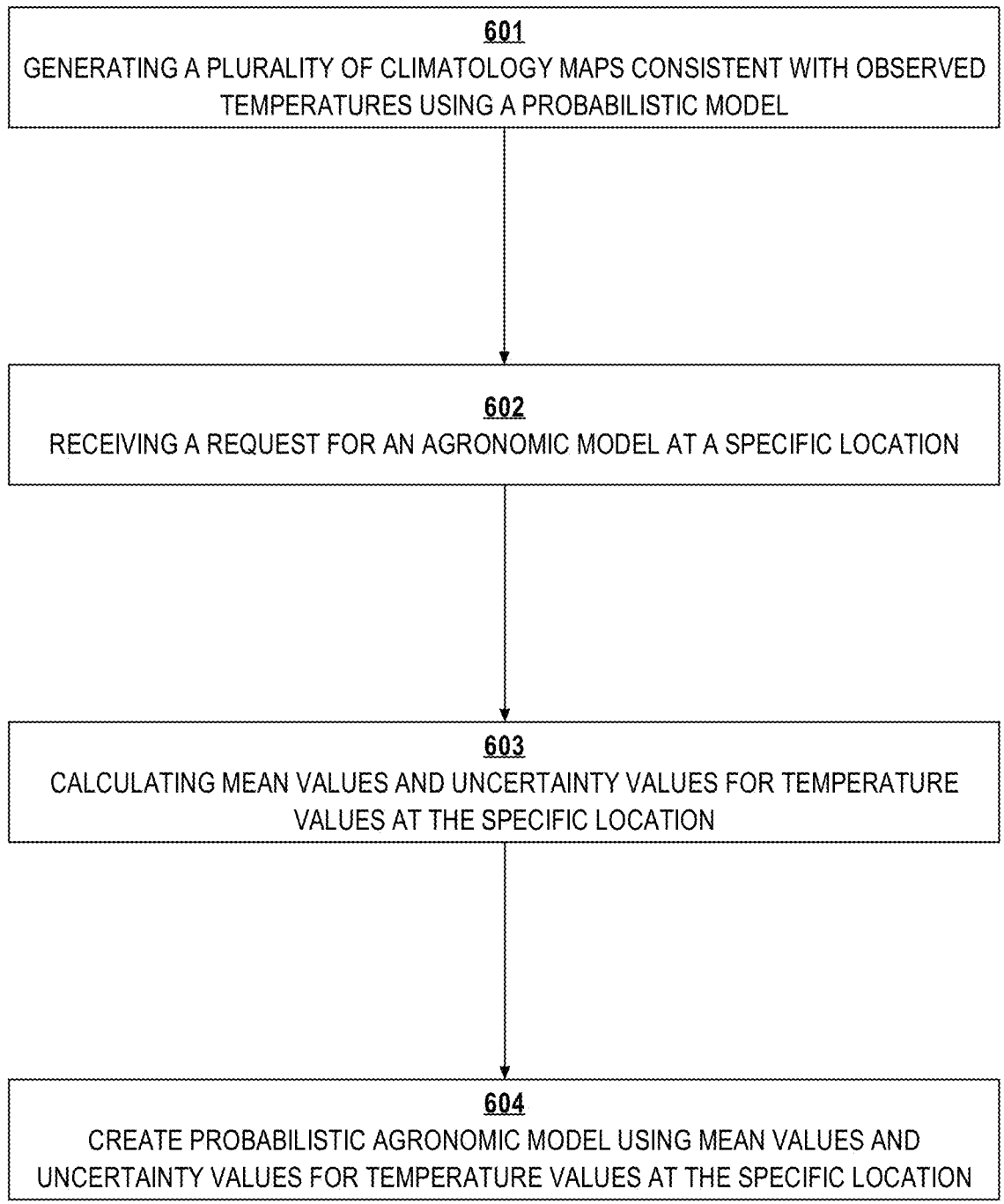
FIG. 6 is a flow chart which depicts an example method for creating an agronomic model using probabilistic estimates.

In an embodiment, probabilistic models are used to produce probabilistic estimates for temperature to be used in agronomic models. FIG. 6 illustrates an example method for creating an agronomic model using probabilistic estimates. For purposes of illustrating a clear example, FIG. 6 is described in the context of the system of FIG. 1, but other embodiments may be implemented using other kinds of computer systems.

At step 601, the process generates a plurality of climatology maps consistent with observed temperatures using a probabilistic model. For example, weather computing system 109 creates a plurality of climatology maps in memory that are consistent with observed temperatures using a probabilistic model. A probabilistic model of temperature creates a range of temperatures for each location that are consistent with the observed temperatures. The ranges also include probabilities of temperatures, such as a 68% probability that the maximum temperature in Townsville on a given day is between 64° F. and 66° F. Weather computing system 109 employs probabilistic logic to create the plurality of maps such that 68% of the maps corresponding to a given day include maximum temperatures in Townsville between 64° F. and 66° F. Weather computing system 109 may then store the plurality of maps in volatile memory.

At step 602, the process receives a request for an agronomic model at a specific location. For example, weather computing system 109 receives a request from user device 102 to provide an agronomic model at a specific location. Upon receiving the request for the agronomic model, weather computing system 109 may retrieve the plurality of maps from memory.

At step 603, the process calculates mean values and uncertainty values for temperature values at the specific location. For example, weather computing system 109 calculates the mean values and uncertainty values based upon instructions in a stored program. In an embodiment, weather computing system 109 accesses the stored probability distributions for temperatures and applies them to a given location for a period of time. Weather computing system 109 then determines the mean, or average, for each temperature variable and an uncertainty in that variable. The uncertainty may be based on a combination of the probabilistic distribution for the variable and on extrapolated errors based on factors such as distance from an observation post or elevation.

At step 604, weather computing system 109 creates a probabilistic agronomic model using the mean values and uncertainty values for the temperatures at the specific location. By using a probabilistic model for temperature interpolation, weather computing system 109 can create ranges of expected values for the agronomic factors. For example, growing degree days are often calculated by determining the average temperature for a day and subtracting a baseline temperature which varies depending on the crop.

With point estimates, each growing degree day has a specific value. For example, if the point estimates for maximum and minimum temperatures at a field in Arlen are 86° F. and 65° F. respectively, then the growing degree days would be estimated at 75.5° F. minus the baseline for the crop.

Alternatively, if a probabilistic estimate uses the same values but with an uncertainty of 2° F., the growing degree days would be estimated at a range of 73.5° F. minus the baseline for the crop to 77.5° F. minus the baseline for the crop. For a crop like corn which may take up to 800 growing degree days to mature, the range in growing degree days can make a large difference. The agronomic model using probabilistic factors is better able to determine a range of dates for when a crop reaches maturity which varies depending on the type of crop and the uncertainty in the temperature estimates.

Data Aggregation

In an embodiment, probabilistic models may be used to determine the risk of specific events. Weather computing system 109 may generate a plurality of climatology maps consistent with observed temperatures for a given day. Additionally, weather computing system 109 may generate the plurality of climatology maps for each day of the year. Once weather computing system 109 has created a plurality of maps for the year, weather computing system 109 may aggregate the data with the maps to determine risks for one or more events.

For example, weather computing system 109 may search through the generated maps to find a series of maps where the maximum temperature for each day is significantly higher than usual. Weather computing system 109 may compare the number of maps that include the high maximum temperature with maps that show average temperatures for those days to determine a likelihood of a heat wave. Alternatively, weather computing system 109 may create scenarios for the entire year using the series of maps to better understand the risk of a particular event.

Alternatively, weather computing system 109 may use the aggregated data to estimate days of specific events. As an example, the last spring freeze is defined as the last day in spring where the minimum temperature is at or below freezing temperature (30° F.). Accurately predicting the date of the last spring freeze can be important for creating recommendations to plant crops that are adversely affected by freezing temperatures. Additionally, the last spring freeze is often used as a baseline for determining the growing season of specific crops. By accurately predicting the start of the growing season, weather computing system 109 may create ideal recommendations for when a farmer should begin growing crops to receive the greatest benefit from the crops.

To accurately estimate the last spring freeze for a given location, weather computing system 109 may view the aggregated maps for the year and, for each location, determine the number of maps that include a minimum temperature below freezing. With the selected maps, weather computing system 109 may determine the point where the likelihood of a freeze occurring drops off substantially. Alternatively, weather computing system 109 may make a probability distribution for each day which include the likelihood the day will have a minimum temperature below freezing.

After determining risks for one or more events or creating probabilistic estimates for the days of one or more events, weather computing system 109 may feed the results into an agronomic model. In some scenarios, the results of the aggregation may be used to augment an existing agronomic model. For example, one result of the data aggregation may include a 20% chance of a heat wave occurring during a given week. Agronomic model module 119 may use the 20% chance of a heat way to augment the estimate of heat stress for a given crop.

In one embodiment, risks of events are used to generate alerts to users. In other embodiments, risks of events are used in the initial creation of the agronomic model to adjust the range of the estimated yield of a crop. In further embodiments, risks of events are used by insurance companies to determine the possible liabilities associated with one or more fields.

Selecting a Modeling Method

Figure 7:
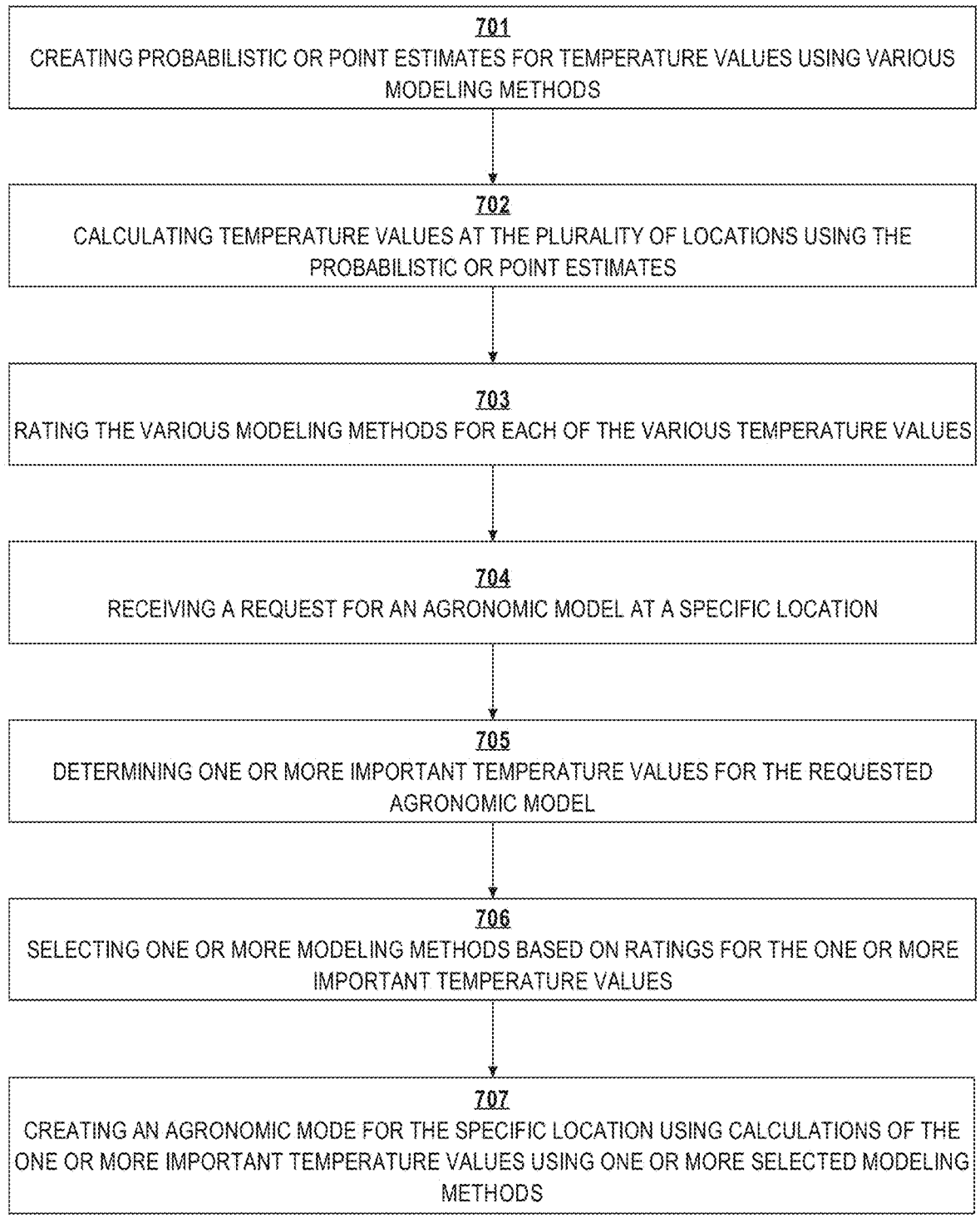
FIG. 7 is a flow chart which depicts a sample method for selecting one of a plurality of modeling approaches.

In an embodiment, weather computing system 109 employs model determination logic 115 to choose a modeling method for a given scenario. FIG. 7 is a flow chart which depicts a sample method for selecting one of a plurality of modeling approaches. For purposes of illustrating a clear example, FIG. 7 is illustrated in the context of the system of FIG. 1, but other embodiments may be implemented using other kinds of computer systems.

At step 701, weather computing system 109 creates probabilistic or point estimates for temperature using the various modeling methods as described above.

At step 702, temperature interpolation module 114 estimates temperature values at the observation locations. In estimating temperature values at the observation locations, temperature interpolation module 114 may be configured to ignore the observed temperature value at the location. Alternatively, temperature interpolation module 114 may estimate temperature values for future days at a specific observation location without ignoring the observed temperatures at the specific observation location. By estimating temperatures at observation locations, weather computing system 109 may compare the estimates to actual observations in order to determine the accuracy of a given modeling method.

At step 703, weather computing system 109 rates the various modeling methods for each of the various temperature values. Rating the various modeling methods may include determining one or more of reliability factors 117 for the modeling methods. Reliability factors 117 may include mean absolute error, continuous ranked probability score, or bias. The mean absolute error describes the average difference between the estimated temperature and the actual temperature. The continuous ranked probability score measures the accuracy of a probabilistic model. The bias describes the tendency of a modeling method to be either consistently high or consistently low.

Reliability factors 117 may function to determine the accuracy of each method for each value, the consistency of each method for each value, and the bias for each method for each value. For example, one method may create the most accurate measurements of the maximum temperature while another model may have the most reliable range of temperature values for the day, such as the maximum temperature minus the minimum temperature. Each method is rated for each variable based on accuracy, consistency, and bias.

Additionally, methods may be rated based on their ability to accurately predict event risks 116. Predicting event risks 116 may include accurately predicting that a specific event will occur, accurately predicting the day of the specific event, or a combination of the two. A model that is consistently better at predicting event risks 116 may be more useful to insurance companies or in generating alerts for one or more users. The method that consistently estimates accurate maximum temperatures may not be the best method for determining when the last spring freeze occurs.

In estimating event risks 116, each modeling methods may be additionally rated based on reliability factors 107 as they relate to event risks 116. As an example, a model which has a consistent bias of a few days early may be a better model to use then a model which is more accurate but contains less consistency because a biased model may be augmented to reduce the bias. In an example, if a model is consistently two to three days early in predicting the last spring freeze, future estimates made by the model may have two days added to them to reduce the bias.

In rating the models, model determination logic 115 may be configured to prefer one type of reliability factor over another. For example, for the maximum temperature it may be better to decrease accuracy in favor of eliminating bias over time. A model which has a consistent bias of a few degrees lower than the actual temperature would be less useful in estimating agronomic factors such as heat stress as it would consistently estimate less damage to the crop due to heat stress. Alternatively, a model which is less accurate but has no bias will not always accurately predict the heat stress to a crop, but over a large period of time the average estimated heat stress to the crop will likely be more accurate because the model has no bias in a single direction.

At step 704, weather computing system 109 receives a request for an agronomic model at a specific location.

At step 705, model determination logic 115 determines one or more of agronomic factors 118 to focus on in selecting a modeling method. Agronomic factors may include heat stress, growing season length, and growing degree days. Each agronomic factor may be affected by reliability factors 117 or event risks 116 in different ways. For example, the estimated heat stress would be most affected by the accuracy of the estimates of maximum temperature. In contrast, the estimate of growing degree days, which uses the average of the maximum temperature and minimum temperature over a period of time, may be more affected by the consistency of the estimates of maximum and minimum temperatures. As another example, the growing season length is most affected by the estimate for the last spring freeze.

In an embodiment, one of modeling approaches 113 is used for the agronomic model to keep the results consistent. For example, a single model may be used so that the nighttime heat stress is not estimated as higher than the daytime heat stress. Alternatively, multiple modeling methods may be used to create the most accurate results for each of agronomic factors 118. In additional embodiments, models are rated by their accuracy in estimating agronomic factors over time. Thus, if a modeling method's predictions of the growing degree days in Springfield are consistently off by 10° F., then the modeling method may receive a relatively low rating, while a modeling method that is off by 15° F. in extremely rare situations may receive a higher rating.

In one embodiment, model determination logic 115 chooses models based on reliability factors 117 for a given location. For example, the first modeling method described above which employs Delaunay triangulation may have a lower accuracy for locations which sit on or near the boundary lines of a triangle. Model determination logic 115 may be configured to independently create reliability factors 117 for each location. Model determination logic 115 may then factor in the location for the temperature estimates in determining which model to choose.

At step 706, model determination logic 115 selects one or more of modeling approaches 113 based on the one or more important temperature values. Model determination logic 115 may weight each important temperature value by its relative importance and apply that weight to reliability factors 117 associated with each important temperature value. Thus, model determination logic 115 may not always choose the model which is most accurate with respect to the most important factor. For example, one modeling method may accurately estimate the maximum temperature while the estimations for minimum temperature and the agronomic factors associated with minimum temperature are extremely inaccurate. Even if maximum temperature is the most important factor for this estimation, the inaccuracies in the other factors would be given weight when determining whether to choose this modeling method.

At step 707, weather computing system 109 creates an agronomic model using temperature estimates produced by the one or more chosen modeling methods. Weather computing system 109 may then send the agronomic model to user device 102, store the agronomic model in volatile memory, use the predictions in agronomic model to improve the selection mechanism of model determination logic 115, or send the agronomic model to a third party.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
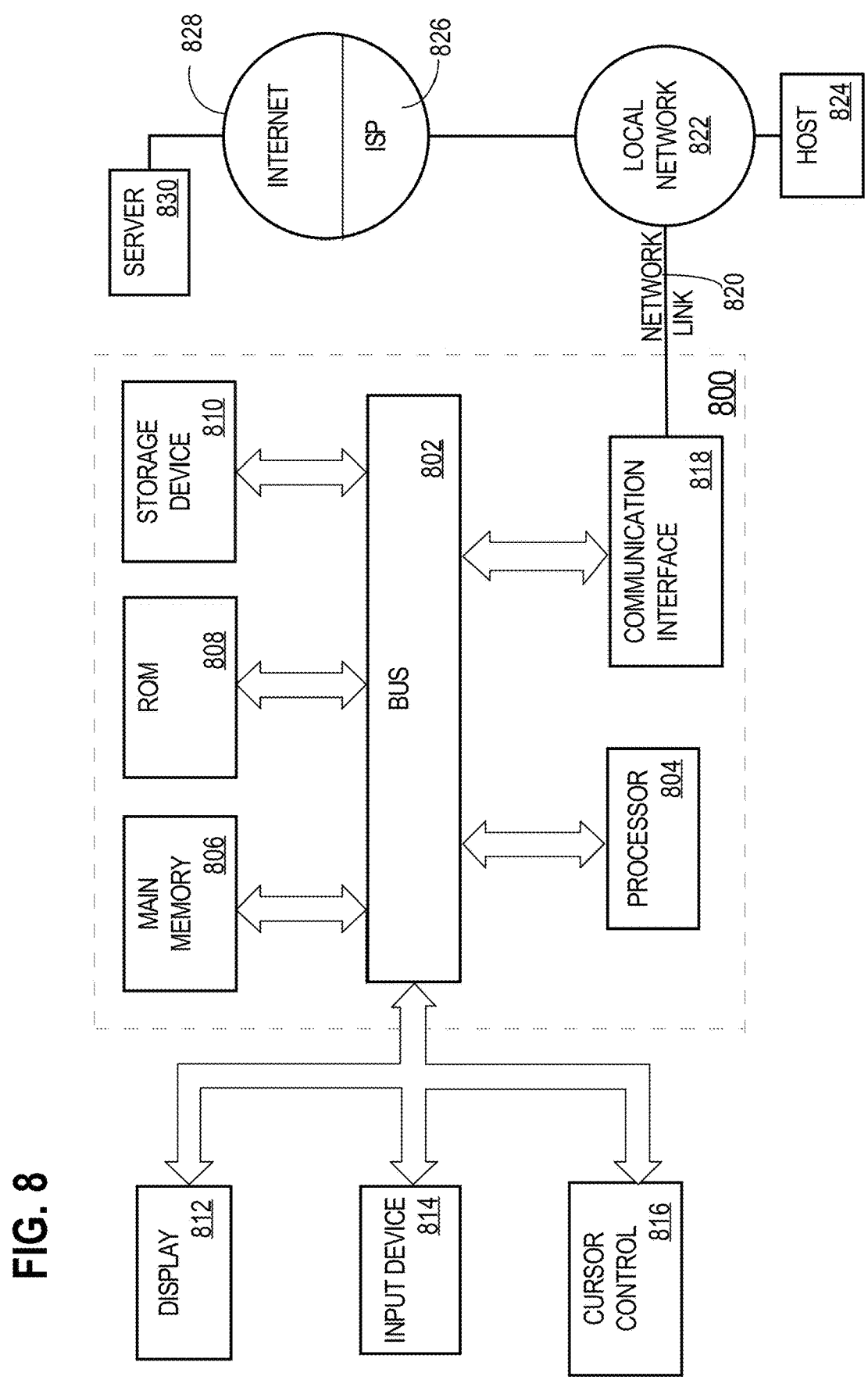
FIG. 8 is a block diagram that illustrates a computer system upon which embodiments may be implemented.

For example, FIG. 8 is a block diagram that illustrates a computer system 800 upon which embodiments may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis, such as x) and a second axis, such as y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Benefits of Certain Embodiments

Using the techniques described herein, a computer can deliver estimates of near-surface air temperature that are significantly improved as to granularity. For example, the techniques herein can deliver temperature values at a field location level, which otherwise are not available from public and/or commercial temperature data sources. The processes may be used in computer implementations to interpolate and deliver to a user computing device, in response to a request, precise estimates of actual temperature values at growing fields or other locations even when observed temperature values are for much less granular areas or locations, are incomplete, are missing or unavailable, and/or when climatology reports and/or observed temperature values include anomalies.

Additionally, the techniques described herein improve the performance of weather computing systems by creating probabilistic reconstruction with uncertainty estimates. Factoring in uncertainty in the modeling of temperatures allows the weather computing system to create estimates that factor in the probabilistic error. For example, a major difference exists between a probability that a freeze occurred and a point estimate that a freeze occurred. The latter is unable to factor in the possibility that a freeze did not occur when creating estimates or sending notifications to a user. The probabilistic estimates also allow for a propagation of error. Where a 10% probability of a freeze occurring each day for ten days would be rounded down to 0% for a point estimate, probabilistic estimates would aggregate the 10% chance of a freeze for each day. Thus, over ten days the point estimate would estimate that no freeze occurred while the probabilistic estimate would estimate that there is a 65% chance that a freeze occurred. Consequently, the performance of the end user computing device may be improved because device applications may receive and use data that otherwise would not be available, and/or avoid errors that are introduced by using data that is incomplete or contains anomalies.

Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
using a server computer, receiving, over a computer network, one or more climatology records each comprising a plurality of data values representing minimum temperatures and maximum temperatures in a plurality of locations;
creating and storing one or more mean fields in memory of the server computer based on the one or more climatology records, wherein the mean field describes climatology values for a plurality of geographical locations;
receiving, over the computer network, a plurality of different observed temperature measurement values from a plurality of observation posts;
creating one or more anomaly field values in the memory based on a difference between the temperature values in the one or more climatology records and the observed temperature measurements from the plurality of observation posts;
using the one or more anomaly field values, generating an anomaly field, wherein the anomaly field describes anomaly values for a plurality of geographic locations as a function of distance from the anomaly field values at the observation posts;
estimating, based on the mean field and one or more anomaly fields, one or more particular temperature values at one or more particular locations that are different than locations of the plurality of observation posts by:
determining one or more particular mean field values for the one or more particular locations based on the mean field;
computing one or more particular anomaly values for the one or more particular locations based on the anomaly field; and
computing the one or more particular temperature values at the one or more particular locations as a difference between the one or more particular mean field values and the one or more particular anomaly values;
substituting the one or more particular temperature values in the memory in place of one or more of the plurality of data values in the one or more climatology records.

2. The method of claim 1 further comprising:
creating in the memory one or more probabilistic data models of temperatures as a function of distance from one or more of the plurality of observation posts;
generating, in the memory, one or more probability distributions for the one or more particular temperature measurement at the one or more particular locations.

3. The method of claim 2 further comprising:
creating the one or more probabilistic models of temperature independently for each day of a year;
aggregating the one or more probabilistic models of temperature and storing aggregated probabilistic models of temperature in the memory;
determining a risk value in the memory, representing a risk of one or more events occurring on a particular day based on the aggregated probabilistic models of temperature.

4. The method of claim 1 further comprising:
creating in the memory data representing a plurality of models of temperature as a function of distance using different modeling approaches;
creating and storing in memory one or more temperature estimate values at one or more of the plurality of observation posts;
calculating one or more reliability factors for the plurality of models of temperature based at least in part on the temperature estimate values and the observed temperature measurements and storing the reliability factors in the memory;
selecting and using one or more of the plurality of models of temperature for estimating the one or more particular temperatures based at least in part on the one or more reliability factors.

5. The method of claim 1 further comprising:
generating and storing values representing estimates of one or more temperature related factors for the one or more particular locations;
creating and storing in the memory a plurality of models of temperature and temperature related factors using different modeling approaches;
calculating one or more reliability factors for the plurality of models of temperature and temperature related factors;
determining a relative importance value in the memory representing a relative importance of temperature to the plurality of temperature related factors;
selecting one or more of the plurality of models of temperature and temperature related factors based at least in part on the relative importance of temperature to the plurality of temperature related factors and the one or more reliability factors.

6. The method of claim 5 further comprising:
receiving, over the network from a requesting device, a request for one or more temperature associated measurements, including at least one of a minimum temperature, a maximum temperature, an average temperature; and a temperature related factor of the plurality of temperature related factors;
assigning a higher priority to the requested one or more temperature associated measurements than the remaining one or more temperature associated measurements.

7. The method of claim 1 further comprising:
in the memory, generating and storing one or more grids that correspond to the one or more particular locations;
calculating one or more estimated temperatures for the one or more grids.

8. The method of claim 7 further comprising:
receiving, over the network from a requesting device, one or more requests for one or more specific temperature estimates;
wherein generating the one or more grids comprises:
determining the one or more particular locations;
creating the one or more grids around the one or more particular locations;
sending, over the network to the requesting device, the one or more specific temperature estimates.

9. The method of claim 8 wherein receiving the one or more requests for the one or more specific estimates includes a designation of the requesting device as the requesting location;
wherein determining the one or more particular locations comprises locating the requesting device based on one or more device signals and creating a grid centered around the located requesting device.

10. The method of claim 1 further comprising,
receiving, over the network from a requesting device, one or more requests for one or more agronomic models at one or more specific locations and agricultural information for the one or more particular locations;
generating one or more agronomic factors using the one or more temperature estimates in the memory, creating one or more agronomic models based on the estimated one or more particular temperature values and the agricultural information for the one or more particular locations;
sending, over the network to the requesting device, the one or more agronomic models.

11. The method of claim 1 further comprising:
receiving, over the network from a requesting device, one or more requests for one or more specific temperature estimates at one or more specific locations;
wherein estimating the one or more particular temperature measurements occurs in response to the one or more requests;
sending, over the network to the requesting device, the one or more specific temperature estimates at the one or more specific locations.

12. One or more non-transitory storage media storing instructions which, when executed by one or more computing devices, cause performance of:
using a server computer, receiving, over a computer network, one or more climatology records each comprising a plurality of data values representing minimum temperatures and maximum temperatures in a plurality of locations;
creating and storing one or more mean fields in memory of the server computer based on the one or more climatology records, wherein the mean field describes climatology values for a plurality of geographical locations;
receiving, over the computer network, a plurality of different observed temperature measurement values from a plurality of observation posts;
creating one or more anomaly field values in the memory based on a difference between the temperature values in the one or more climatology records and the observed temperature measurements from the plurality of observation posts;
using the one or more anomaly field values, generating an anomaly field, wherein the anomaly field describes anomaly values for a plurality of geographic locations as a function of distance from the anomaly field values at the observation posts;
estimating, based on the mean field and one or more anomaly fields, one or more particular temperature values at one or more particular locations that are different than locations of the plurality of observation posts by:
determining one or more particular mean field values for the one or more particular locations based on the mean field;
computing one or more particular anomaly values for the one or more particular locations based on the anomaly field; and
computing the one or more particular temperature values at the one or more particular locations as a difference between the one or more particular mean field values and the one or more particular anomaly values;
substituting the one or more particular temperature values in the memory in place of one or more of the plurality of data values in the one or more climatology records.

13. The one or more non-transitory storage media of claim 12 further comprising:
creating in the memory one or more probabilistic data models of temperatures as a function of distance from one or more of the plurality of observation posts;
generating, in the memory, one or more probability distributions for the one or more particular temperature measurement at the one or more particular locations.

14. The one or more non-transitory storage media of claim 12 further comprising:
creating the one or more probabilistic models of temperature independently for each day of a year;
aggregating the one or more probabilistic models of temperature and storing aggregated probabilistic models of temperature in the memory;
determining a risk value in the memory, representing a risk of one or more events occurring on a particular day based on the aggregated probabilistic models of temperature.

15. The one or more non-transitory storage media of claim 12 further comprising:
creating in the memory data representing a plurality of models of temperature as a function of distance using different modeling approaches;
creating and storing in memory one or more temperature estimate values at one or more of the plurality of observation posts;
calculating one or more reliability factors for the plurality of models of temperature based at least in part on the temperature estimate values and the observed temperature measurements and storing the reliability factors in the memory;
selecting and using one or more of the plurality of models of temperature for estimating the one or more particular temperatures based at least in part on the one or more reliability factors.

16. The one or more non-transitory storage media of claim 12 further comprising:
generating and storing values representing estimates of one or more temperature related factors for the one or more particular locations;
creating and storing in the memory a plurality of models of temperature and temperature related factors using different modeling approaches;
calculating one or more reliability factors for the plurality of models of temperature and temperature related factors;
determining a relative importance value in the memory representing a relative importance of temperature to the plurality of temperature related factors;
selecting one or more of the plurality of models of temperature and temperature related factors based at least in part on the relative importance of temperature to the plurality of temperature related factors and the one or more reliability factors.

17. The one or more non-transitory storage media of claim 16 further comprising:
  receiving, over the network from a requesting device, a request for one or more temperature associated measurements, including at least one of a minimum temperature, a maximum temperature, an average temperature; and a temperature related factor of the plurality of temperature related factors;
  assigning a higher priority to the requested one or more temperature associated measurements than the remaining one or more temperature associated measurements.

18. The one or more non-transitory storage media of claim 12 further comprising:
  in the memory, generating and storing one or more grids that correspond to the one or more particular locations;
  calculating one or more estimated temperatures for the one or more grids.

19. The one or more non-transitory storage media of claim 18 further comprising:
  receiving, over the network from a requesting device, one or more requests for one or more specific temperature estimates;
  wherein generating the one or more grids comprises:
  determining the one or more particular locations;
  creating the one or more grids around the one or more particular locations;
  sending, over the network to the requesting device, the one or more specific temperature estimates.

20. The one or more non-transitory storage media of claim 19 wherein receiving the one or more requests for the one or more specific estimates includes a designation of the requesting device as the requesting location;
  wherein determining the one or more particular locations comprises locating the requesting device based on one or more device signals and creating a grid centered around the located requesting device.

21. The one or more non-transitory storage media of claim 12 further comprising,
  receiving, over the network from a requesting device, one or more requests for one or more agronomic models at one or more specific locations and agricultural information for the one or more particular locations;
  generating one or more agronomic factors using the one or more temperature estimates in the memory, creating one or more agronomic models based on the estimated one or more particular temperature values and the agricultural information for the one or more particular locations;
  sending, over the network to the requesting device, the one or more agronomic models.

22. The one or more non-transitory storage media of claim 12 further comprising:
  receiving, over the network from a requesting device, one or more requests for one or more specific temperature estimates at one or more specific locations;
  wherein estimating the one or more particular temperature measurements occurs in response to the one or more requests;
  sending, over the network to the requesting device, the one or more specific temperature estimates at the one or more specific locations.

* * * * *